United States Patent
Will et al.

[11] Patent Number: 5,935,730
[45] Date of Patent: Aug. 10, 1999

[54] MULTILAYER ADHESIVE LABEL

[75] Inventors: Rolf Will, Bad Toelz; Hans-Peter Ast, Holzkirchen, both of Germany

[73] Assignee: Zweckform Etikettiertechnik GmbH, Holzkirchen, Germany

[21] Appl. No.: 09/059,772

[22] Filed: Apr. 14, 1998

Related U.S. Application Data

[63] Continuation of application No. 08/921,789, Sep. 2, 1997, Pat. No. 5,766,795, which is a continuation of application No. 08/594,392, Jan. 31, 1996, abandoned, which is a continuation of application No. 08/268,352, Aug. 10, 1994, abandoned, which is a continuation of application No. 08/083,797, Jun. 28, 1993, Pat. No. 5,358,804, which is a division of application No. 07/702,237, May 17, 1991, Pat. No. 5,262,251, which is a division of application No. 07/454,518, Dec. 21, 1989, Pat. No. 5,032,477, which is a division of application No. 07/254,383, Oct. 5, 1988, Pat. No. 4,911,994, which is a continuation of application No. 07/070,642, Jul. 2, 1987, Pat. No. 4,801,514, which is a continuation of application No. 06/739,376, May 30, 1985, abandoned.

[30] Foreign Application Priority Data

Aug. 16, 1984 [DE] Germany .................................. 3430162

[51] Int. Cl.⁶ .................................................. H01M 2/02
[52] U.S. Cl. ........................... 429/167; 428/354; 428/910; 283/81
[58] Field of Search .................... 428/203, 192, 428/910, 354; 429/167; 40/638; 283/81

[56] References Cited

U.S. PATENT DOCUMENTS

| | | | |
|---|---|---|---|
| 2,595,963 | 5/1952 | Lewis et al. | 136/132 |
| 3,121,021 | 2/1964 | Copeland | 117/122 |
| 3,518,152 | 6/1970 | Storti | 156/540 |
| 3,535,293 | 10/1970 | Anderson | 260/78.5 |
| 3,897,295 | 7/1975 | Dowbenko et al. | 156/272 |
| 4,039,707 | 8/1977 | O'Malley | 428/40 |

(List continued on next page.)

FOREIGN PATENT DOCUMENTS

| | | |
|---|---|---|
| 2095104 | 7/1994 | Canada . |
| 0043243 | 1/1982 | European Pat. Off. . |
| 0358445 | 3/1990 | European Pat. Off. . |
| 0606699 | 7/1994 | European Pat. Off. . |
| 1449743 | 7/1966 | France . |
| 2459520 | 6/1979 | France . |
| 2484115 | 6/1980 | France . |
| 3211331 | 10/1982 | Germany . |
| 8216905 | 10/1982 | Germany . |

(List continued on next page.)

OTHER PUBLICATIONS

"Labels Makes Batteries Last Longer", Packaging, A Cahners Publication, May 1986.

*Hankbook of Adhesives*, 3rd Edition, Irving Skeist, New York Dec. 1990, pp. 641–663.

*Handbook of Adhesives*, 2nd Edition, Irving skeist, New York Dec. 1977, p. 552.

Pressure–Sensitive PVC Battery Covers From West Germany, USITC Publication 2265, Mar. 1990.

Haftetikett ersetzt Stahlmantel SUPER POWER im neuen Anzug, Verpackungs–Rundschau Jun./1983. Ast.

"Paper Converting" Dec. 1979, vol. 20, No. 4, pp. 1 to 8, and 22.

(List continued on next page.)

*Primary Examiner*—Alexander Thomas
*Attorney, Agent, or Firm*—Cobrin & Gittes

[57] ABSTRACT

Multilayer adhesive label which is shrinkable on a circumferential surface of a body, particularly of a dry-cell battery, including a carrier layer for an outwardly visible imprint which is covered with a transparent protective layer, whose outermost layer is formed by means of an at least axially stretched, transparent laminated foil of shrinkable plastics material. The carrier layer may have at least one cut in the vicinity of its edge extending along the generating line of the circumferential surface of the body.

8 Claims, 4 Drawing Sheets

U.S. PATENT DOCUMENTS

| | | | |
|---|---|---|---|
| 4,124,431 | 11/1978 | Schramer et al. | 156/309 |
| 4,163,822 | 8/1979 | Walter | 428/304 |
| 4,217,263 | 8/1980 | Magnotta | 260/29.8 |
| 4,230,753 | 10/1980 | Sheyon | 428/40 |
| 4,248,762 | 3/1981 | Hornibrook et al. | 260/42.22 |
| 4,248,918 | 2/1981 | Hornibrook et al. | 428/40 |
| 4,264,657 | 4/1981 | Tollette | 428/35 |
| 4,313,986 | 2/1982 | Magnotta | 428/40 |
| 4,627,154 | 12/1986 | Pattison | 29/623.1 |
| 4,704,173 | 11/1987 | Hoffman . | |
| 5,190,609 | 3/1993 | Lin et al. | 156/85 |
| 5,292,566 | 3/1994 | Shacklett, III | 428/40 |
| 5,328,738 | 7/1994 | McKillip et al. | 428/40 |
| 5,443,668 | 8/1995 | Zaborney et al. | 156/86 |

FOREIGN PATENT DOCUMENTS

| | | |
|---|---|---|
| 3245057 | 7/1983 | Germany . |
| 43-25679 | 11/1968 | Japan . |
| 49-93459 | 9/1974 | Japan . |
| 50-66537 | 6/1975 | Japan . |
| 53-19758 | 4/1976 | Japan . |
| 52-13566 | 2/1977 | Japan . |
| 52-25236 | 2/1977 | Japan . |
| 52-131124 | 11/1977 | Japan . |
| 52-131126 | 11/1977 | Japan . |
| 54-178785 | 12/1979 | Japan . |
| 56-4675 | 1/1981 | Japan . |
| 56-150545 | 11/1981 | Japan . |
| 57-210563 | 12/1982 | Japan . |
| 59-123161 | 7/1984 | Japan . |
| 62-177864 | 8/1987 | Japan . |
| 1123187 | 8/1968 | United Kingdom . |
| 2103008 | 2/1983 | United Kingdom . |
| 2184672 | 7/1987 | United Kingdom . |
| 2193834 | 2/1988 | United Kingdom . |
| 2198412 | 6/1988 | United Kingdom . |
| WO9642115 | 12/1996 | WIPO . |

OTHER PUBLICATIONS

Paper, Film & Foil Converter, Mar. 1985, p. 107.

Den här produkten blev en av de mest lönsamma för Svensk Fackhandel 1981, Sweden 1981, 14 sheets.

Selbstklebe–Etiketten aus Kunstoff für Packmittal aus Kunststoff, H.P. Ast., published in Die Verpackung 1/84 Küsnacht.

Memorandum, Avery Label Systems Ltd., Apr. 24, 1984.

Memorandum, Avery Label, Jan. 7, 1982.

*Pressure Sensitive Products*, Skeist Laboratories, New Jersey, Jul. 1984, pp. 294 and 319.

"Die Herstellung von Haftklebstoffen", BASF, Dec. 1979 (including English language translation).

*Handbook of Pressure–Sensitive Adhesive Technology*, Donatas Satas, New York, Dec. 1982, pp. 397–399, 481 and 572.

*Handbook of Pressure–Sensitive Adhesive Technology*, 2nd Ed., Donatas Satas, New York, Dec. 1989, pp. 746, 747, 766, and 807.

MULTILAYER ADHESIVE LABEL

This is a continuation application of application Ser. No. 08/921,789, filed Sep. 2, 1997, U.S. Pat. No. 5,766,795; which in turn is a continuation application of application Ser. No. 08/594,392, filed Jan. 31, 1996, abandoned; which in turn is a continuation application of application Ser. No. 08/268,352, filed Aug. 10, 1994, abandoned; which in turn is a continuation application of application Ser. No. 08/083,797, filed Jun. 28, 1993, U.S. Pat. No. 5,358,804; which in turn is a divisional application of application Ser. No. 07/702,237, filed May 17, 1991, U.S. Pat. No. 5,262,251; which in turn is a divisional application of application Ser. No. 07/454,518, filed Dec. 21, 1989,U.S. Pat. No. 5,032,477; which in turn is a divisional application of application Ser. No. 07/254,383, filed Oct. 5, 1988, now U.S. Pat. No. 4,911,994, issued Mar. 27, 1990; which in turn is a continuation application of application Ser. No. 07/070,642, filed Jul. 2, 1987, now U.S. Pat. No. 4,801,514, issued Jan. 13, 1989; and which in turn is a continuation application of application Ser. No. 06/739,376, filed May 30, 1985, abandoned.

The invention is directed to a multilayer adhesive label which is shrinkable on the circumferential surface of a body, particularly a dry-cell battery.

In known labels of this type the carrier layer is composed of stretched, shrinkable plastics material. The protective layer of the imprint consists of a glossy lacquer. Such a protective layer of lacquer cannot always sufficiently protect the imprint located beneath it; neither can a vapor deposited layer on which the imprint is printed under the control of a layer. Particularly when there are extensive mechanical stresses, for example, in a battery chamber, damage may even occasionally occur which leads to a discharging of the battery.

It is the object of the invention to provide an adhesive label which better protects the imprint and the layers located beneath the latter.

According to this, the foil of shrinkable plastics material assumes the protective function. This other foil can be provided in addition to the known foil of shrinkable plastics material which is located in the adhesive label. But it can also assume its function In the latter case the carrier, which would otherwise have the function of the shrinkable plastics material foil, is composed of paper so that the label is substantially less expensive.

Adhesive labels are often applied to a body in such a way that their edges which extend along a generating line of the circumferential surface of the body, overlap. It has been shown that, after some hours, the border area closest to the edge lying outside can lift off, depending on the inherent rigidity of he label and on the resiliency of the label resulting from it, particularly after the shrinkage.

It is another object of the invention to prevent the edge lying outside and extending along the generating line of the circumferential surface of the body and the border area adjoining it from lifting off in the manner described above.

The cut to be provided according to the invention breaks the inherent rigidity, and, therefore, the resiliency, in the critical area. On the other hand, however; the cut is not visible from the outside when carried out according to and embodiment of the invention.

The invention will be explained in the following with the aid of embodiment examples and with reference to the attached drawings.

DESCRIPTION OF THE PREFERRED EMBODIMENT

Figure 2:
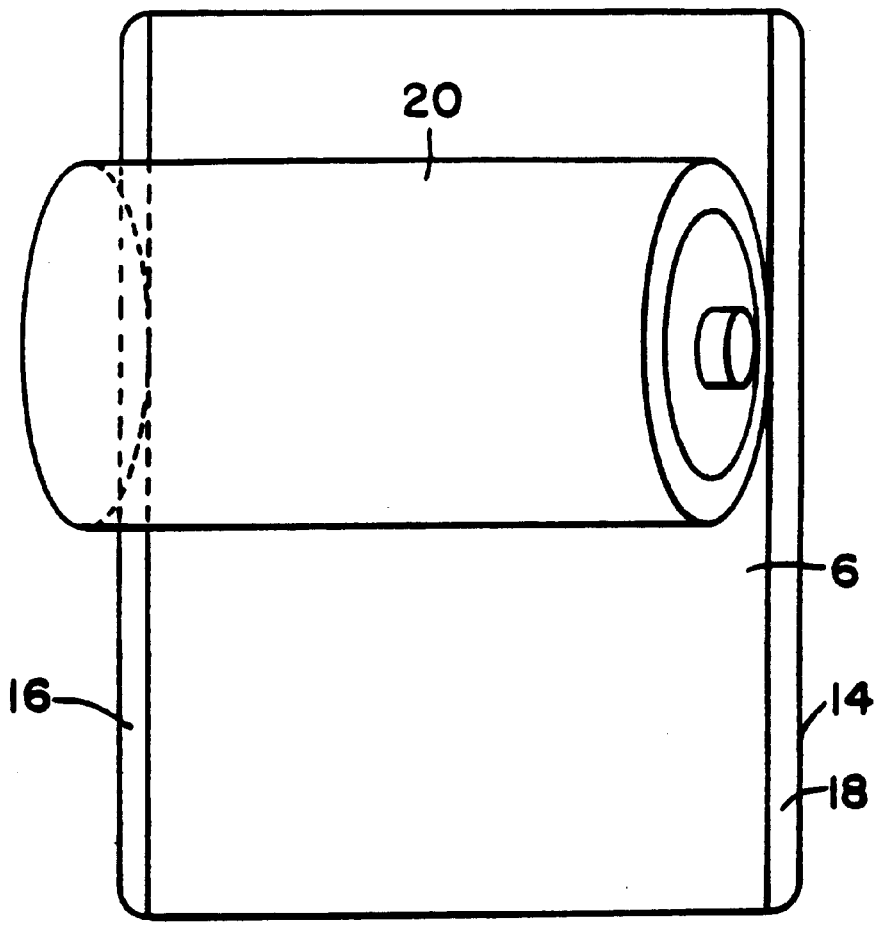
FIG. 2 schematically shows the applications, known per se, of such an adhesive label on the body of a dry-cell battery.
Figure 1:
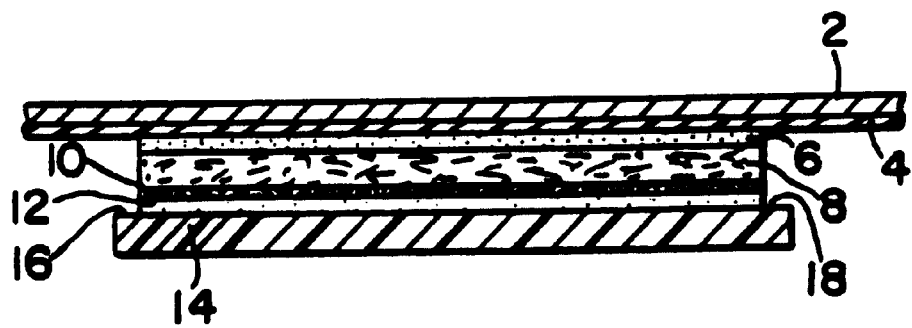
FIG. 1 shows a first embodiment form of an adhesive label in cross-section.

The adhesive label according to FIG. 1 is placed on a base 2 which is provided with an adhesive repellent layer 4, for example of silicone. A carrier 8 composed of paper which is provided underneath with a contact adhesive layer 6, is detachably arranged on the adhesive repellent layer 4. An imprint 10, which is shown only schematically, is applied to the outside of the carrier 8. The surface which is provided with the imprint 10 is covered by a foil 14 of stretched, shrinkable plastics material provided on the back with a laminated adhesive layer 12. This foil 14 projects at both borders 16, 18 over the layers 6, 8, 10, 12 lying below it. The laser is formed by means of the layers 6, 8, 10, 12, 14 and is detached before being applied to a battery body 20 (FIG. 2) on the base 2,4. The axial dimensions of the battery body 20 conform to dimensions of the layers 6, 8, 10, 12 of the label according to FIG. 1. The label is now applied in such away that the foil 14 of shrinkable plastics material lies on the outside and the layer 6 is glued to the dry-cell battery body 20. When the label is glued on around the body 20 of the dry-cell battery, the label is subjected, along with the body 20, to a thermal effect as a result of which the foil 14 shrinks and, by means of this, the projecting borders 16, 18 firmly attach to the border area of the front faces of the body 20.

Figure 3:
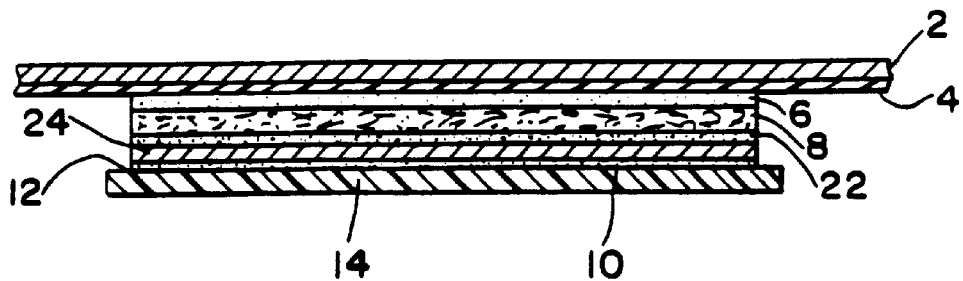
FIG. 3 shows a second embodiment form of an adhesive label in cross-section.

The label according to FIG. 3 is constructed in a similar manner as that according to FIG. 1, but is provided with additional layers. The layers corresponding to those according to FIG. 1 are provided with the same reference numerals as the corresponding layers in FIG. 1. In contrast to the embodiment according to FIG. 1, the imprint 10 is not located on the carrier 8. Rather, the carrier 8 is provided with a vapor deposited layer 22 which carries a primer layer 24 on the outside for the imprint 10. The vapor deposited layer lends the body a metallic appearance from the outside and forms a good contrast for the imprint 10.

Figure 4:
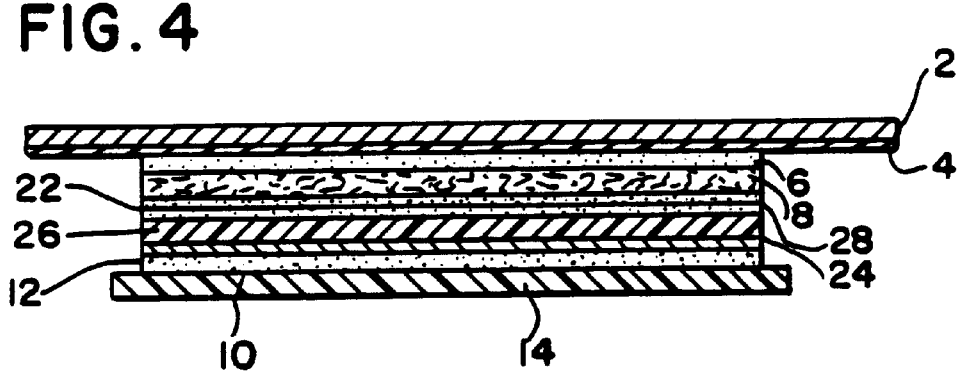
FIG. 4 shows a third embodiment form of an adhesive label in cross-section.

With respect to the reference numerals, the same applies to FIG. 4 as to FIG. 3. But in this case a foil layer 26 is applied to the outer surface of the carrier 8, which foil layer 26 is provided on the back with the vapor deposited layer 22 and a laminated adhesive layer 28 located on its rear side. This a label according to FIG. 4 is distinguished by its particularly high resistability and particularly good insulation characteristics.

Figure 5:
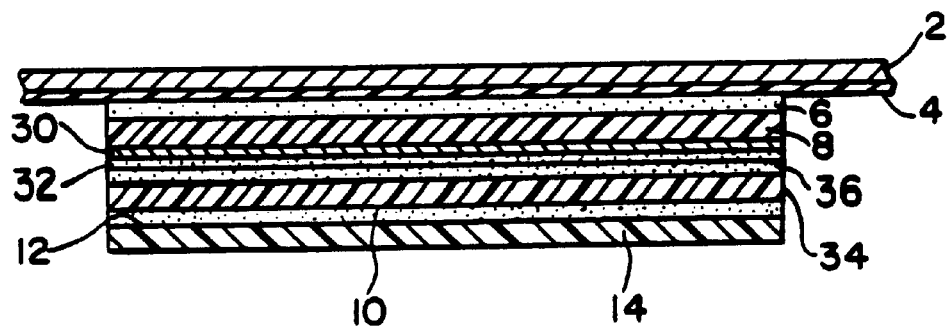
FIG. 5 shows a fourth embodiment form of an adhesive label in cross-section.

In the embodiment according to FIG. 5, a vapor deposited layer 32 is placed on the carrier 8 of plastics material through the intermediary of a primer layer 30, and a transparent plastics material foil 34 provided on the outside with an imprint 10, is placed on the vapor deposited layer 32 through the intermediary of a laminated adhesive layer 36. A transparent foil 14 is placed on the imprint 10 by means of a laminated adhesive layer 12. The foils 8, 34 and 14 can be stretched, particularly in the same direction in the circumferential direction. In the case of FIG. 5, the foil 14 does not project in the circumferential direction, in contrast to the embodiment examples according to FIGS. 1, 3 and 4.

Figure 6:
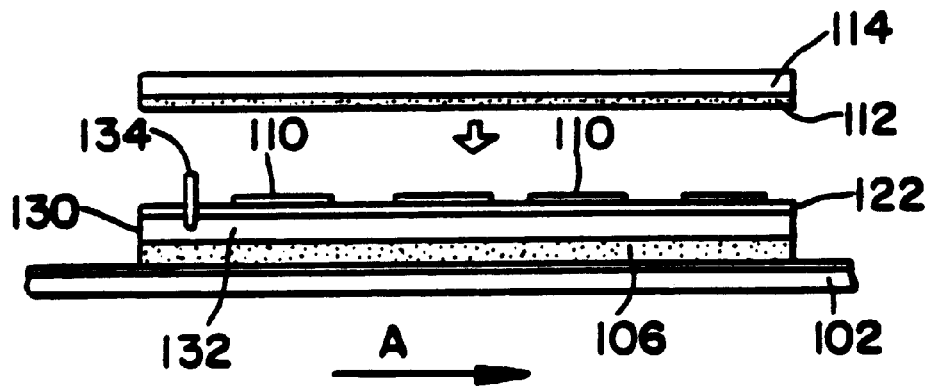
FIG. 6 shows an adhesive label provided with a cut in cross-section.

The adhesive label according to FIG. 6 is detachably applied to a base 102 with an adhesive repellent layer 104, particularly of silicone. It consists of a carrier layer 108 which is provided underneath with a contact adhesive layer 106 and carries a vapor deposited layer 122 on top on which an imprint 110 is located. The imprint is covered by a laminated foil 114 whose underside is provided with a laminating adhesive layer 112.

The base 112 has the form of a belt which runs in the direction of arrow A during the production of the labels and during the detaching of the labels for applying to the body to be labeled.

Closest to its downstream edge 130, the vapor deposited layer 122 and the carrier layer 108 are provided with a cut 132 to be produced by means of a cutting knife 134.

Figure 7:
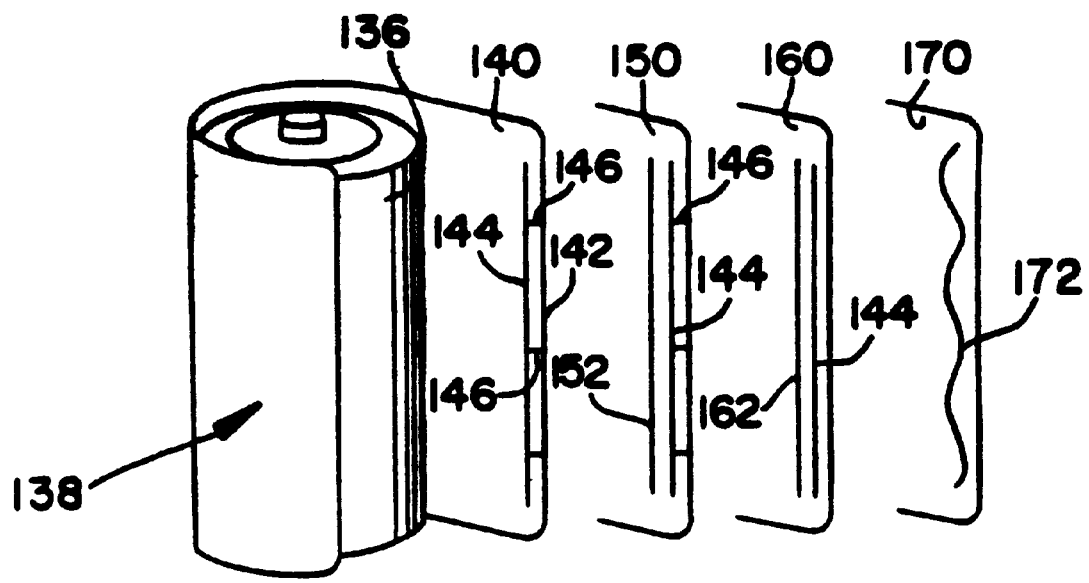
FIG. 7 shows various cuts.

FIG. 7 shows a dry-cell battery 136 around which is placed a label 138; only the border area 40 projects away. Located closest to the edge 142 of the border area 140 is a straight cut 144 with branches 146 extending to the edge 142. To the right of this is an embodiment of a border area 150 of a label which has a second straight cut 152 inside next to the straight cut 144 and the branches 146.

To the right of the latter is a border area 160 having two straight cuts 144 and 162.

Figure 8:
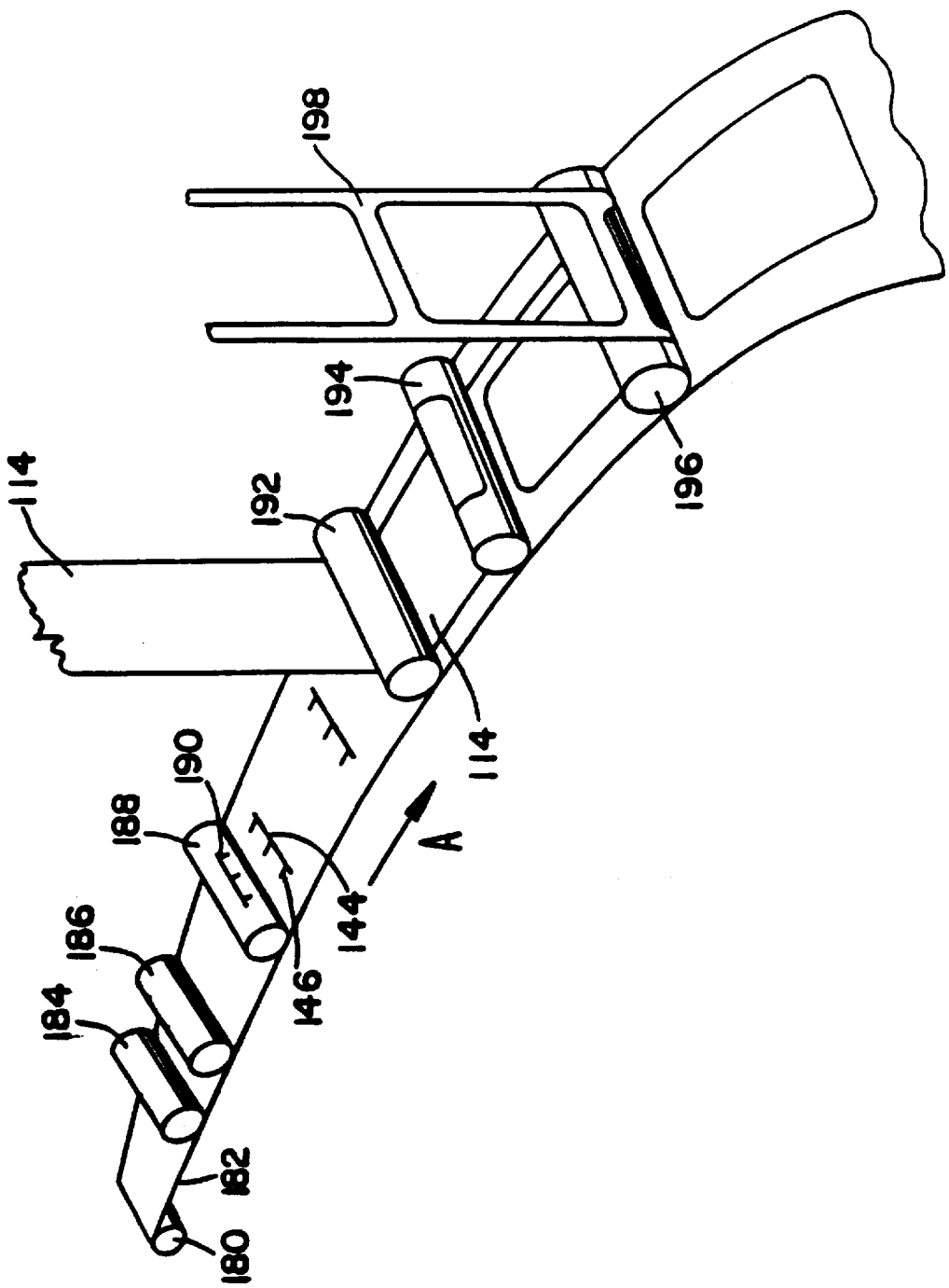
FIG. 8 shows a method for producing the adhesive label with the cut.

To the right of the latter is a border area 170 having a serpentine cut 172. FIG. 8 shows a layer composite 182 drawn off of a roller 180 and comprising layers 102, 104, 106, 108 and 122, according to FIG. 6.

This layer composite is provided on top with an imprint by means of two printing rollers 184 and 186, which imprint corresponds to the imprint 110 according to FIG. 6. Next the layer arrives under a cutting roller 188 with a cutting knife 190 which produces the cuts 144 and 146, according to FIG. 7. Thereupon, the laminated foil 114, which is provided on its underside with a laminated adhesive layer 112, is applied, by means of a deflecting roller 192, to the layer composite provided with the imprint and the cut The labels are cut out of the composite produced in this manner with a label cutter 194. The matrix 198 remaining around the cut out labels is pulled off with a subsequent roller 196.

We claim:

1. A multilayer adhesive label adhering onto a circumferential surface of a dry-cell battery body having a top end face and a bottom end face, comprising:

a carrier layer structure having an inner side and an outer side, said outer side of said carrier layer structure being composed of a stretched transparent foil;

an adhesive layer carried on said inner side of said carrier layer structure and being adhered to said circumferential surface of said battery body; and an outwardly visible imprint on an inner side of said transparent foil, wherein the label defines first edge portions, which extend along a generating line of said circumferential surface of said battery body, and overlap, and second edge portions which extend axially beyond said end faces of said battery body and are shrunk onto said end faces.

2. The adhesive label of claim 1, wherein said adhesive layer is a contact adhesive layer and adheres onto said and faces of said battery body.

3. The adhesive label of claim 1, wherein said stretched transparent foil is stretched in said circumferential direction of said battery body.

4. The adhesive label of claim 1, wherein said carrier layer comprises a metal layer on said inner side of said stretched transparent foil.

5. The adhesive label of claim 4, wherein said metal layer is on an inner side of said imprint.

6. A label enclosing a circumferential surface of a cylindrical dry-cell battery body by overlapping the circumferential surface and by being shrunk onto a top end face and a bottom end face of said battery body, comprising:

a layer structure further comprising:

a bottom layer of a plastic foil; and a top layer of a plastic foil with its lower side adhered to an upper side of said bottom layer, said bottom layer and said top layer being simultaneously shrunk in a circumferential direction and onto said top end face and said bottom end face of said battery body, an imprint that is visible through said top layer and printed on one of the upper side of the bottom layer and the lower side of said top layer, and a metallic layer deposited on said bottom layer and arranged below said imprint to be visible through said top layer and contrast said imprint.

7. The label of claim 6, wherein said foils are hard polyvinyl chloride foils.

8. The adhesive label of claim 6, further comprising an adhesive layer adhering the bottom and top layers together, the bottom layer forming a carrier layer and carrying the adhesive layer.

* * * * *